United States Patent [19]
Harrison

[11] Patent Number: 5,267,234
[45] Date of Patent: Nov. 30, 1993

[54] RADIO TRANSCEIVER WITH DUPLEX AND NOTCH FILTER

[75] Inventor: Peter Harrison, Ascot, United Kingdom

[73] Assignee: Technophone Limited, England

[21] Appl. No.: 645,970

[22] Filed: Jan. 24, 1991

[30] Foreign Application Priority Data

Feb. 8, 1990 [GB] United Kingdom ............... 9002813

[51] Int. Cl.$^5$ .................................. G08C 15/00
[52] U.S. Cl. ........................... 370/38; 370/24; 455/19; 455/73
[58] Field of Search ............. 455/73, 77, 78, 80, 455/82; 370/30, 32, 36, 37, 38, 24, 72; 333/126, 129, 132

[56] References Cited

U.S. PATENT DOCUMENTS

| | | | |
|---|---|---|---|
| 3,656,162 | 4/1972 | Mee | 343/180 |
| 3,761,816 | 9/1973 | Condon | 325/22 |
| 3,771,064 | 11/1973 | Hebert, Jr. | 333/1 |
| 3,803,491 | 4/1974 | Osborn | 325/53 |
| 3,815,137 | 6/1974 | Kaegebein | 370/38 |
| 3,987,396 | 10/1976 | Kreger | 455/19 |
| 4,325,140 | 4/1982 | Stitzer | 455/19 |
| 4,462,098 | 7/1984 | D'Avello et al. | 370/30 |
| 4,706,274 | 11/1987 | Baker et al. | 379/61 |
| 4,910,481 | 3/1990 | Sasaki et al. | 455/73 |
| 5,023,866 | 6/1991 | De Muro | 370/24 |

FOREIGN PATENT DOCUMENTS

| | | |
|---|---|---|
| 1791203 | 12/1971 | Fed. Rep. of Germany . |
| 2121385 | 11/1977 | Fed. Rep. of Germany . |
| 61-214625 | 9/1986 | Japan . |
| WO8705181 | 8/1987 | PCT Int'l Appl. . |
| 672702 | 3/1987 | Switzerland . |
| 633007 | 12/1949 | United Kingdom . |

OTHER PUBLICATIONS

298 NEC Research & Development 1987 Oct., No. 87 Tokyo, Japan "Hand-Held Portable Equipment for Cellular Mobile Telephone".

Primary Examiner—Douglas W. Olms
Assistant Examiner—Shick Hom
Attorney, Agent, or Firm—Perman & Green

[57] ABSTRACT

A transceiver for a cellular telephone, particularly a portable telephone, comprises a transmitter and a receiver coupled to a common antenna by an antenna duplex filter. The duplex filter comprises two passband filters connected respectively to the transmitter and the receiver. The receiver comprises a first amplifier. A notch filter tuned to the transmit frequency is connected to the output of the amplifier. The notch filter enables the filtering performance of the receive filter to be relaxed, and the location of the notch filter(s) at the output of amplifier means that the insertion loss is less critical. The requirement for lower filtering performance enables the duplex filter to be smaller and less costly.

20 Claims, 2 Drawing Sheets

RADIO TRANSCEIVER WITH DUPLEX AND NOTCH FILTER

This invention relates to a transceiver comprising a filtering arrangement for selectively filtering radio frequency signals received from, and transmitted to, a common antenna.

BACKGROUND OF THE INVENTION

The transmitter and receiver of a transceiver generally operate at a different respective frequency. An antenna duplexer is often used to couple the transmitter and receiver to a common antenna. In essence an antenna duplexer comprises two different filters in the receive and transmit circuits respectively. The filter in the transmit circuit is generally designed to attenuate frequencies in a stopband including the operating frequency of the receiver, while the filter in the receiver circuit attenuates frequencies in a stopband including the operating frequency of the transmitter.

By way of example U.S. Pat. No. 4,462,098 discloses an antenna duplexer comprising receive and transmit filters each comprising a cascaded arrangement of discrete single pole ceramic bandstop/bandpass filters intercoupled by quarter-wave transmission lines. U.S. Pat. No. 4,431,977 discloses an antenna duplexer in which the receive and transmit filters are formed from a monolithic ceramic block comprising several integral resonators. The receive and transmit filters may be formed from separate blocks or they may be integrated into a single block. An older patent, U.S. Pat. No. 3,728,731 discloses an antenna duplexer in which the receiver and transmitter filters comprise an array of helical resonator filters mounted in a common housing. It is well-known that the electrical characteristics of a filter comprising a cascaded arrangement of individual resonators can be varied by changing the number of resonators and/or by altering the electrical characteristics of the individual resonators (or poles) of the filter and/or by altering the nature of the coupling between adjacent resonators.

In cellular radio telephone systems the separation between adjacent edges of the receive and transmit bandwiths may be relatively close. For example in the ETACS cellular system in the United Kingdom the transmission bandwith is 872-905 MHz and the receiver bandwith is 917-950 MHz. In this case the separation between adjacent edges of the receive and transmit bands is 12 MHz.

The problem which is encountered in cellular radio is to use a duplex filter which in the receive circuit attenuates the transmitter frequency without unduly attenuating the desired receive signal, and likewise in the transmit circuit attenuates the receiver frequency without unduly attenuating the transmit signal. This filtering problem becomes more severe when the transmitter is operating towards the top end of the transmit band, i.e. at a frequency close to the receive band, because the receive filter must still be able to discriminate and pass the desired receive frequency but attenuate the undesired frequency to a significant extent. In order to achieve higher filtering performance the duplex filter is generally provided with more poles and a more complex physical and electrical configuration. Consequently, duplex filters with high filtering performance tend to be both large in size and costly to manufacture. The high cost is an obvious disadvantage. The large size means that high performance filters are not compatible with portable transceiver apparatus where miniaturization is desirable.

A further disadvantage of high performance duplex filters is the associated insertion loss. That is to say, the larger the amount of filtering of the undesired signal, the higher is the loss to the desired signal.

In duplex radio transceivers it is widely recognized in the art that the most difficult filtering requirement is that of removing the relatively large transmitter power from the small signal circuits in the receiver. A greater level of transmitter power can be removed by increasing the receive filter performance. However, the larger the amount of filtering, then the higher is the loss to the desired signal, as mentioned above. In order to maintain usable receiver sensitivity there is a finite limit to the amount of loss that can be tolerated in the receiver circuit before amplification. In prior art transceivers it has been necessary to strike a delicate comprise in the receiver circuit between the requirement to reject transmitter frequencies and an acceptable level of insertion loss.

U.S. Pat. No. 3,656,162 discloses a diplexer for radio communication in which the antenna duplex filter comprises a passband filter in the receiver circuit, and in the transmit circuit a low pass combined with a notch filter tuned to reject signals at the receiver frequency. A drawback of this circuit is that the inclusion of a notch filter in the transmit circuit necessarily increases the insertion loss in the transmit circuit.

SUMMARY OF THE INVENTION

According to the present invention there is provided a transceiver comprising a radio receiver and a radio transmitter operating at a different respective frequency, and duplex filtering means for coupling the receiver and the transmitter to a common antenna, the receiver including amplifying means having input means and output means, wherein the input means of said amplifying means is coupled to the duplex filtering means, characterized in that further filtering means are coupled to the output means of said receiver amplifying means, and in that the further filtering means are adapted to attenuate signals including a frequency substantially equal to the transmitter operating frequency.

By virtue of the further filtering means being provided at the output (rather than the input) to the first amplifying stage of the receiver the insertion loss becomes less critical. Moreover, the presence of the further filtering means relaxes the requirement on the stopband performance of the antenna duplex filter which thus may be physically and electrically less complex in configuration and therefore smaller in size. Since the antenna duplex filter may be miniaturized, a radio transceiver in accordance with the invention may be smaller than its prior art counterpart.

Furthermore because the additional filtering means is incorporated in the receiver circuit, there is no additional loss to the transmit signal in the transmit circuit.

Preferably the further filtering means comprises a notch filter and means may be provided for varying the frequency at which the notch filter effects maximum attenuation.

In a particular embodiment the transmitter is operable at different frequencies and the notch filter is adapted to vary automatically the frequency at which maximum attenuation is effected in response to variations in the transmitter operating frequency.

In one embodiment the notch filter is rendered effective only above a threshold value of the transmit frequency. Below the threshold frequency the notch filter is controlled so as to have no appreciable effect. However, if the receive band is below the transmit band the converse would be true, i.e. the notch filter would be rendered effective below the threshold value.

BRIEF DESCRIPTION OF THE DRAWINGS

An embodiment of the invention will now be described, by way of example, with reference to the accompanying drawings, in which.

DETAILED DESCRIPTION OF A PREFERRED EMBODIMENT

Figure 1:
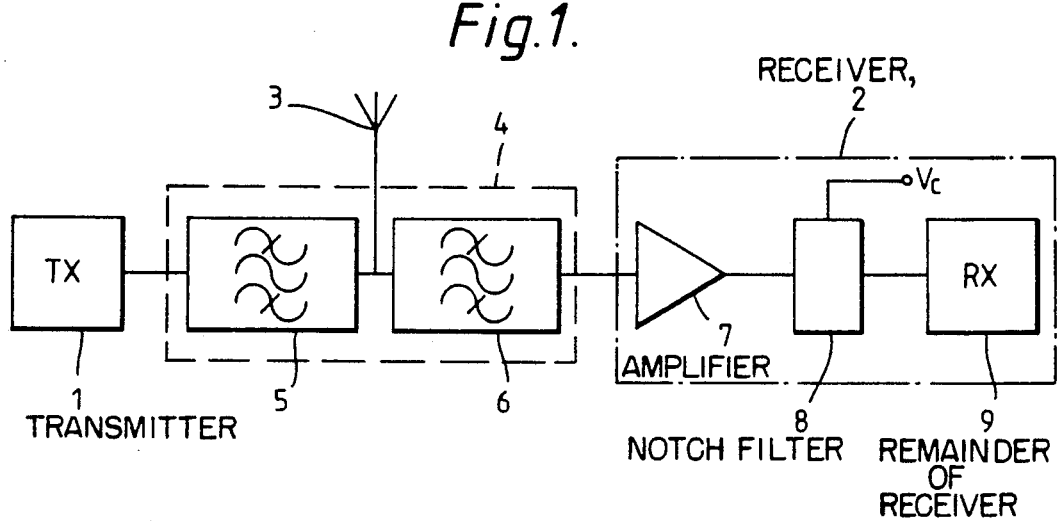
FIG. 1 is a schematic block diagram of a transceiver in accordance with the invention.

The transceiver illustrated schematically in FIG. 1 comprises a transmitter 1 and a receiver 2 coupled to a common antenna 3 via an antenna duplexer 4. As is conventional the transmitter 1 and the receiver 2 operate at a different frequency. For example in the case of the so-called ETACS cellular radio system in operation in the UK, the receiver is operable in the frequency range 917-950 MHz and the transmitter frequency is operable in the frequency range 872-905 MHz. The frequency separation of the transmitter and receiver in operation is fixed at 45 MHz. By comparison the US AMPS cellular radio system has a transmit band of 824-849 MHz and a receive band of 869-894 MHz, with a 45 MHz channel spacing. 869-894 MHz, with a 45 MHz channel spacing.

The antenna duplexer comprises a transmit bandpass filter 5 connected to the transmitter 1 and a receiver bandpass filter 6 connected to the input of the first amplifying stage 7 of the receiver 2. The transmit filter 5 is effective to attenuate frequencies in a stopband including the operating frequency of the receiver 2. Likewise, the receiver filter 6 is effective to attenuate frequencies in a stopband including the operating frequency of the transmitter 1. Antenna duplex filters are themselves well-known in the art and indeed several types were acknowledged in the opening paragraphs of the present application and so no further details will be given here.

In accordance with the present invention a notch filter 8 is connected between the output of the amplifier 7 and the remainder of the receiver 9. The notch filter 8 is tuned to attenuate frequencies in a narrow stopband including the transmit frequency, as discussed in more detail below.

Figure 2:
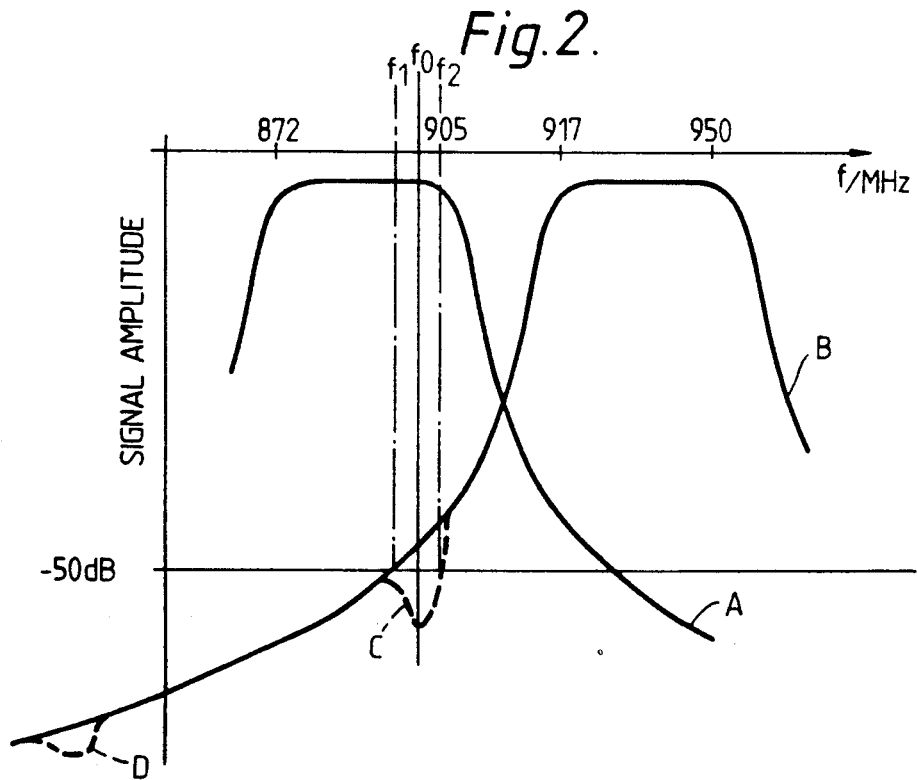
FIG. 2 illustrates the filtering characteristics of the duplex filter and additional notch filter in the receive circuit of a transceiver in accordance with the present invention.

The relative effect of the bandpass filters 5 and 6 and the additional notch filter 8 are shown in FIG. 2, in which signal amplitude is shown on the vertical axis and frequency on the horizontal axis. In the present case the transceiver is intended for operation on the ETACS system, but the invention is equally applicable to other cellular systems and indeed to non-cellular radio systems. Curve A, shown in a solid line, represents the characteristic of the transmit filter 5, from which it can be seen that frequencies outside the transmit band 872-905 MHz are significantly attenuated relative to the frequencies within this range. Curve B, shown in a solid line, represents the characteristic of the receive filter 6, from which it can be seen that frequencies outside the receive band 917-950 MHz are significantly attenuated with respect to the frequencies within this range.

It can also be seen from FIG. 2 that in the range of frequencies $f_1-f_2$ (e.g. 905-905 MHz) towards the top end of the transmit band, the attenuation afforded by the receiver filter (curve B) is less than 50 dB. Therefore, when the transmitter is operating in the top portion of the transmit band $f_1-f_2$ the receiver filter will not be able to attenuate these frequencies as effectively as frequencies below $f_1$. Therefore, the receiver will be subjected to an undesirably high level of spurious signals related to the transmitter frequency.

The broken-line curve C shows the effect of the notch filter 8 in the receiver circuit. The notch filter is tuned to a frequency $f_o$, e.g. 900 MHz, and significantly attenuates frequencies in the narrow range $f_1-f_2$. Indeed, as can be seen from FIG. 2 the attenuation is increased to more that 50 dB for the full range of frequencies $f_1-f_2$. The stopband width of the notch filter 8 is typically 6-10 MHz.

It can be seen from FIG. 2 that the problem of insufficient attenuation (i.e. less that 50 dB) by the receive filter 8 is most prominent only in the top portion of the transmit band $f_1-f_2$. At frequencies lower that $f_1$ the additional filtering provided by the notch filter 8 makes substantially less of an important contribution. The notch filter 8 can therefore, to all intents and purposes be dispensed with at transmit frequencies below the threshold value $f_1$.

To this end the notch filter 8 may be electronically adjustable to vary the filtering characteristics. By applying a control signal Vc to the notch filter 8 the filtering response can be changed. Thus when a first signal $V_1$ is applied to the notch filter 8 the characteristic denoted by curve C is obtained. However, when a second lower valued signal $V_2$ is applied to the notch filter a much less significant filtering effect is achieved as shown by the characteristic denoted by the broken line curve D in FIG. 2. The frequency at which the notch filter 8 is now effective (i.e. the stopband) may even be outside the transmit band so that, to all intents and purposes, the notch filter now offers no useful contribution to the overall filtering in the receiver circuit. The notch filter 8 can now be considered to be in a 'parked' state. Only when the transmit signal falls within the narrow range $f_1-f_2$ is the control signal $V_c$ changed from $V_2$ to $V_1$ so that the filtering characteristic of curve C again becomes effective.

Figure 3:
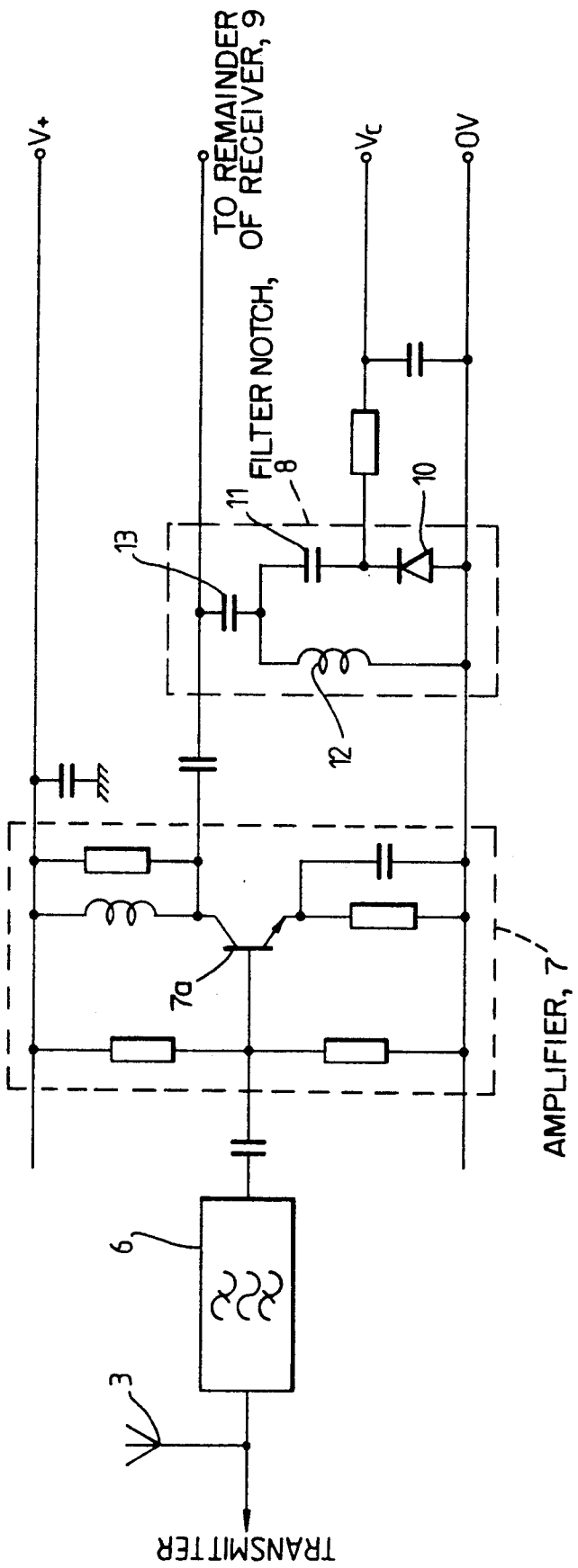
FIG. 3 is a circuit diagram for the receiver circuit of the transceiver in FIG. 1.

FIG. 3 shows, by way of example, a specific circuit configuration for the amplifier 7 and notch filter 8 in the receiver circuit. In this case the notch filter 8 comprises a varactor 10 connected in series with a capacitor 11 and in parallel with an inductor 12. A capacitor 13 is connected to a common point between the capacitor 11 and the inductor 12. The notch filter 8 is designed to resonate at a frequency towards the top part $f_1$ to $f_2$ of the transmit band. In a specific embodiment implemented by the Applicant the capacitor 11 has a value of 12 pF, the capacitor 13 was 2.7 pF, and the inductor 12 was 6 nH. The capacitance of the varactor 10 was variable, e.g. in the range 7-13 pF. The values of these and the various other components shown in the circuit of FIG. 3 may of course be varied depending on the particular application, and as these values will be readily discernible by a person skilled in the art, no further details will be quoted here. With the component values stated above the maximum attenuation of the notch filter occurred at approximately 900 MHz when a control voltage Vc of 2.7 V was applied to the varactor 10. By changing the control voltage Vc to 1 V the resonant frequency could be 'parked' at a value below the transmit band, as discussed above, so that the notch filter 8 to all intents and purposes then has no practical effect. The network of components 10-13 constituting the notch filter 8 is connected to the collector of the transistor 7a (via a capacitor) so that significant additional attenuation of the transmitter signal is achieved at minimal loss to the desired receive signal, and without influencing the loss in the transmit circuit.

In view of the forgoing description it will be evident to a person skilled in the art that various modifications may be made within the scope of the present invention. For example instead of the notch filter becoming effective above a threshold value of the transmit frequency, it may alternatively be dynamically tuned to the transmit frequency and so provide effective filtering over the complete transmit band. Furthermore, the notch filter itself need not be configured in the way depicted in FIG. 3 and indeed any notch filter arrangement may be adopted. In essence the notch filter circuit comprises a reactive element in combination with a high Q resonator. In the case of a tunable notch filter the reactive element will be capable of electronic adjustment. As will be immediately apparent to a person skilled in the art suitable reactive elements would include a varicap diode, an adjustable choke, or a transistor junction, and suitable resonators would include a ceramic dielectric resonator, a stripline, a microstrip, a choke, a crystal, or a SAW resonator. The stopband width of the notch filter may of course be selected according to the particular circumstances and may be narrower or wider than the 6-10 MHz indicated above. Furthermore a high pass filter may be used instead of a notch filter. Finally although in the embodiment described above bandpass filters were used for the transmit and receive filters of the antenna duplexer, low pass and high pass filters respectively may equally be used.

What is claimed is:

1. A transceiver comprising a radio receiver and a radio transmitter each operating at a different respective frequency, and duplex filtering means for coupling an input of the radio receiver and an output of the radio transmitter to a common antenna, the radio receiver including amplifying means having an input and an output, wherein the input of said amplifying means is coupled to the duplex filtering means, characterized in that further filtering means are coupled to the output of said amplifying means, and in that the further filtering means are responsive to a control signal to attenuate signals within a narrow range of frequencies that is specified by the control signal, at least one of the specified narrow range of frequencies including a frequency substantially equal to the radio transmitter operating frequency.

2. A transceiver as claimed in claim 1, wherein the further filtering means comprises a notch filter.

3. A transceiver comprising a radio receiver and a radio transmitter each operating at a different respective frequency, and duplex filtering means for coupling an input of the radio receiver and an output of the radio transmitter to a common antenna, the radio receiver including amplifying means having an input and an output, wherein the input of said amplifying means is coupled to the duplex filtering means, characterized in that further filtering means are coupled to the output of said amplifying means, and in that the further filtering means are adapted to attenuate signals within a narrow range of frequencies that includes a frequency substantially equal to the radio transmitter operating frequency; wherein the further filtering means comprises a notch filter; and wherein the transceiver further comprises means for varying the frequency at which the notch filter effects maximum attenuation.

4. A transceiver as claimed in claim 3, wherein the notch filter is rendered effective at a threshold value of the transmit frequency.

5. A transceiver as claimed in claim 4, wherein the notch filter is controlled in such manner that when the transmitter frequency is below the threshold value, the frequency at which the notch filter effects maximum attenuation is lower than the transmitter frequency.

6. A transceiver as claimed in claim 3, wherein the transmitter is operable at different frequencies, and the notch filter is adapted to vary automatically the frequency at which maximum attenuation is effected in response to variations in the transmitter operating frequency.

7. A transceiver as claimed in claim 6, wherein the notch filter is rendered effective at a threshold value of the transmit frequency.

8. A transceiver as claimed in claim 7, wherein the notch filter is controlled in such manner that when the transmitter frequency is below the threshold value, the frequency at which the notch filter effects maximum attenuation is lower than the transmitter frequency.

9. A transceiver as claimed in claim 6, wherein the notch filter includes an electronically adjustable reactive device for varying the frequency at which maximum attenuation is effected.

10. A transceiver as claimed in claim 9, wherein the notch filter is rendered effective at a threshold value of the transmit frequency.

11. A transceiver as claimed in claim 9, wherein the notch filter is controlled in such manner that when the transmitter frequency is below the threshold value, the frequency at which the notch filter effects maximum attenuation is lower than the transmitter frequency.

12. A transceiver as claimed in claim 6 wherein means are provided for generating a control signal indicative of the transmitter operating frequency, and the frequency at which the notch filter effects maximum attenuation is varied in response to said control signal.

13. A transceiver as claimed in claim 12 wherein the notch filter is rendered effective at a threshold value of the transmit frequency.

14. A transceiver as claimed in claim 12, wherein the notch filter is controlled in such manner that when the transmitter frequency is below the threshold value, the frequency at which the notch filter effects maximum attenuation is lower than the transmitter frequency.

15. A transceiver as claimed in claim 9 wherein means are provided for generating a control signal indicative of the transmitter operating frequency, and the frequency at which the notch filter effects maximum attenuation is varied in response to said control signal.

16. A transceiver as claimed in claim 15 wherein the notch filter is rendered effective at a threshold value of the transmit frequency.

17. A transceiver as claimed in claim 15, wherein the notch filter is controlled in such manner that when the transmitter frequency is below the threshold value, the frequency at which the notch filter effects maximum attenuation is lower than the transmitter frequency.

18. A transceiver as claimed in claim 13, wherein the notch filter is controlled in such manner that when the transmitter frequency is below the threshold value, the frequency at which the notch filter effects maximum attenuation is lower than the transmitter frequency.

19. A transceiver, comprising:
a radio receiver operating within a first range of frequencies and a radio transmitter operating within a second range of frequencies;
duplex filtering means for coupling an output of said radio transmitter and an input of said radio receiver to a common antenna; wherein
said radio receiver includes amplifying means having an input and an output, said input of said amplifying means being coupled to said duplex filtering means; said transceiver further including,
notch filter means coupled to said output of said amplifying means, said notch filter means being adapted to attenuate frequencies within a frequency band, the frequency band including frequencies within said second range of frequencies; and
means for varying a frequency at which said notch filter means effects maximum attenuation.

20. A transceiver as set forth in claim 19 wherein said notch filter means includes means, responsive to a control signal, for varying the frequencies within the frequency band.

* * * * *